US012563593B2

(12) United States Patent
Fu

(10) Patent No.: US 12,563,593 B2
(45) Date of Patent: Feb. 24, 2026

(54) CONFIGURATION DETERMINATION METHOD AND DEVICE, AND CONFIGURATION INDICATION METHOD AND DEVICE

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 379 days.

(21) Appl. No.: 18/255,520

(22) PCT Filed: Dec. 4, 2020

(86) PCT No.: PCT/CN2020/133980
§ 371 (c)(1),
(2) Date: Jun. 1, 2023

(87) PCT Pub. No.: WO2022/116166
PCT Pub. Date: Jun. 9, 2022

(65) Prior Publication Data
US 2024/0032094 A1     Jan. 25, 2024

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W
74/006; H04W 72/0446; H04W 72/1215;
H04L 5/0044; H04L 5/0082; H04L
5/0091; H04L 5/0048
See application file for complete search history.

(56) References Cited

U.S. PATENT DOCUMENTS

| | | | | |
|---|---|---|---|---|
| 2021/0385863 A1* | 12/2021 | Fan | ................... | H04W 74/0841 |
| 2023/0189334 A1* | 6/2023 | He | ......................... | H04W 72/56 |
| | | | | 370/329 |
| 2023/0284261 A1* | 9/2023 | Xu | ........................ | H04W 74/006 |
| | | | | 370/328 |
| 2023/0413320 A1* | 12/2023 | Singh | ................. | H04W 74/0875 |

FOREIGN PATENT DOCUMENTS

| | | |
|---|---|---|
| CN | 110100399 A | 8/2019 |
| CN | 111954181 A | 11/2020 |
| WO | WO 2020169071 A1 | 8/2020 |

OTHER PUBLICATIONS

International Search Report and Written Opinion of International Application No. PCT/CN2020/133980, dated Aug. 27, 2021, 12 pages.
European Patent Office, Extended European Search Report issued in Application No. 20964012.7 dated Dec. 12, 2023, 9 pages.

* cited by examiner

*Primary Examiner* — Chae S Lee
(74) *Attorney, Agent, or Firm* — Finnegan, Henderson, Farabow, Garrett & Dunner, L.L.P.

(57) ABSTRACT
A method for determining a configuration is performed by a terminal, and includes: determining, based on indication information, to communicate with a base station according to one of a first configuration or a second configuration; wherein the first configuration is a channel occupancy configuration by the base station, and the second configuration is a channel occupancy configuration by the terminal.

16 Claims, 13 Drawing Sheets determining, based on indication information, to communicate with a base station according to a first configuration or to communicate with the base station according to a second configuration, wherein the first configuration is a frame-based equipment (FBE) configuration of the base station, and the second configuration is an FBE configuration of the terminal    S101

FIG. 1

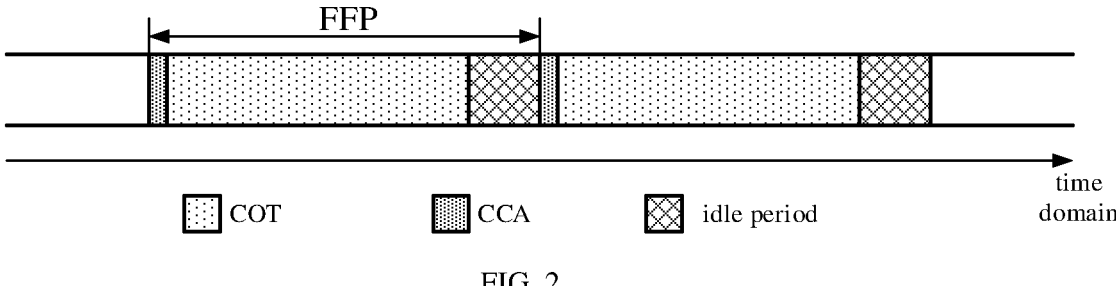

FFP

COT     CCA     idle period     time domain

FIG. 2

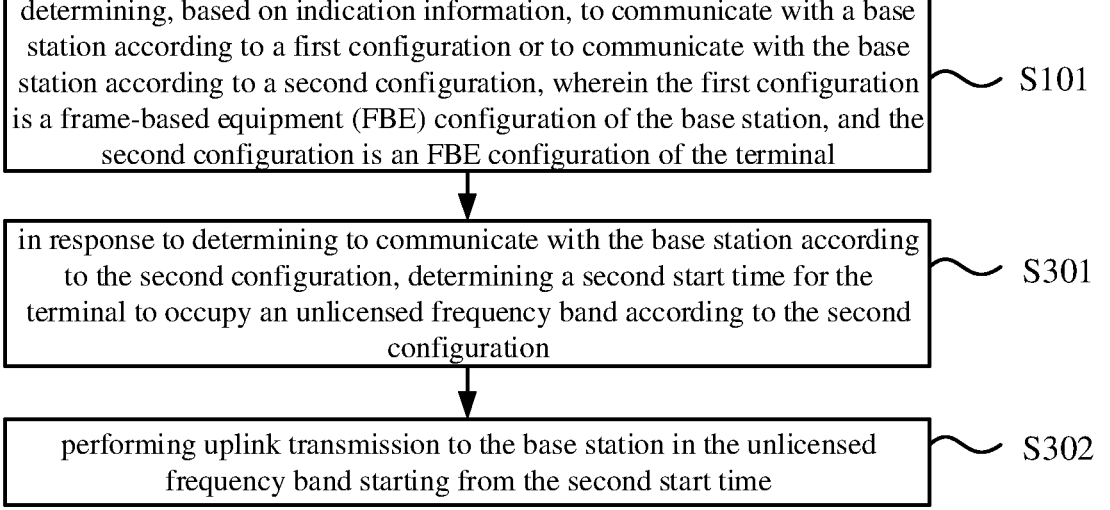

determining, based on indication information, to communicate with a base station according to a first configuration or to communicate with the base station according to a second configuration, wherein the first configuration is a frame-based equipment (FBE) configuration of the base station, and the second configuration is an FBE configuration of the terminal    S101 in response to determining to communicate with the base station according to the second configuration, determining a second start time for the terminal to occupy an unlicensed frequency band according to the second configuration    S301 performing uplink transmission to the base station in the unlicensed frequency band starting from the second start time    S302

FIG. 3

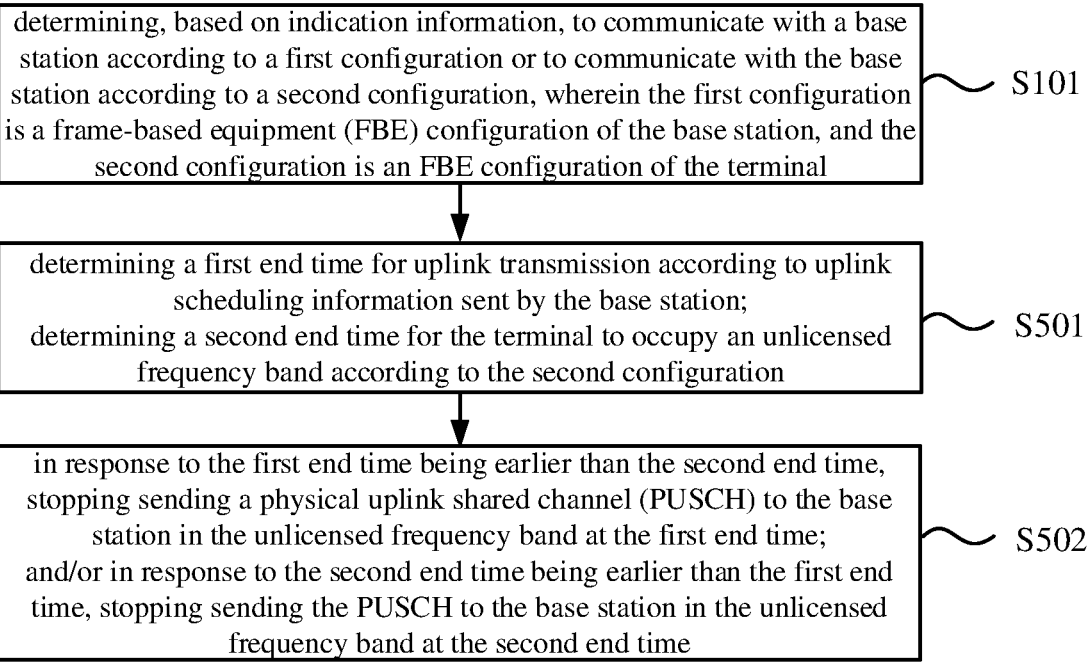

determining, based on indication information, to communicate with a base station according to a first configuration or to communicate with the base station according to a second configuration, wherein the first configuration is a frame-based equipment (FBE) configuration of the base station, and the second configuration is an FBE configuration of the terminal

S101 determining a first end time for uplink transmission according to uplink scheduling information sent by the base station;
determining a second end time for the terminal to occupy an unlicensed frequency band according to the second configuration

S501 in response to the first end time being earlier than the second end time, stopping sending a physical uplink shared channel (PUSCH) to the base station in the unlicensed frequency band at the first end time;
and/or in response to the second end time being earlier than the first end time, stopping sending the PUSCH to the base station in the unlicensed frequency band at the second end time

S502

FIG. 5 in response to the indication information being the RRC signaling, determining, based on the RRC signaling, to communicate with the base station according to the first configuration or to communicate with the base station according to the second configuration, wherein the first configuration is a frame-based equipment (FBE) configuration of the base station, and the second configuration is an FBE configuration of the terminal

Figures 8, 9:
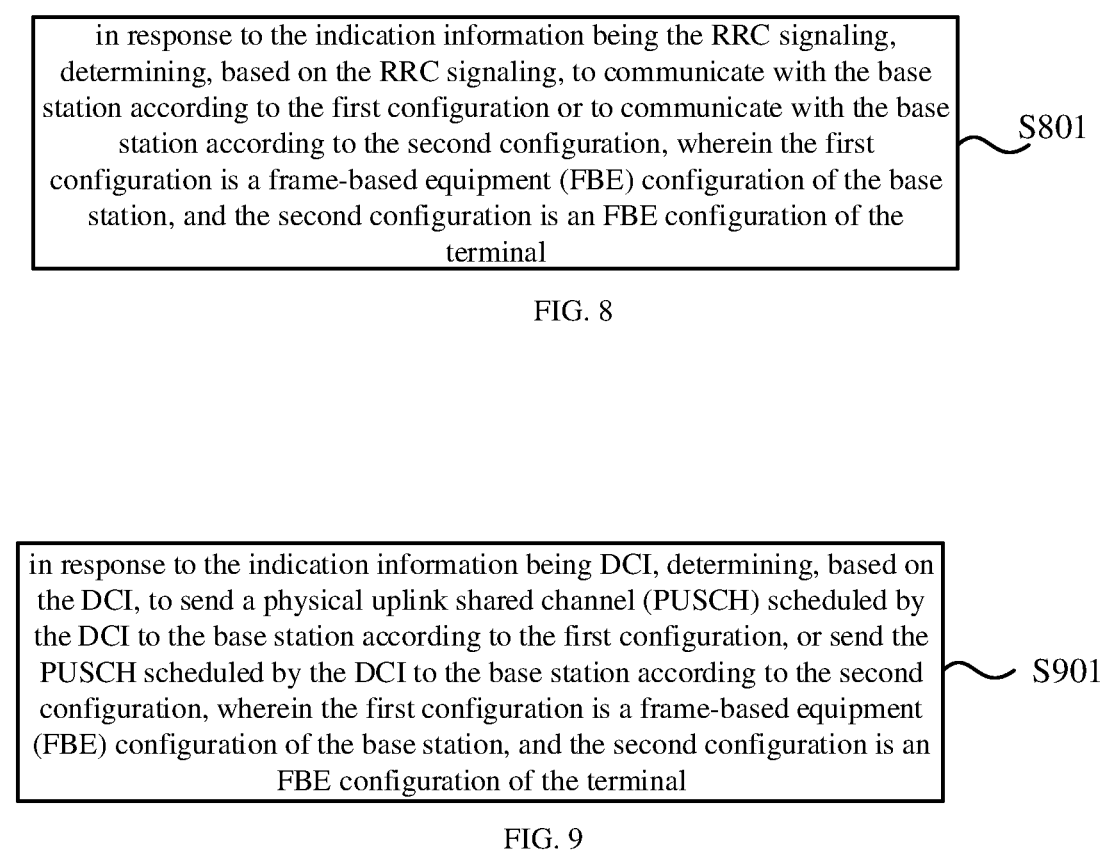

~S801

FIG. 8 in response to the indication information being DCI, determining, based on the DCI, to send a physical uplink shared channel (PUSCH) scheduled by the DCI to the base station according to the first configuration, or send the PUSCH scheduled by the DCI to the base station according to the second configuration, wherein the first configuration is a frame-based equipment (FBE) configuration of the base station, and the second configuration is an FBE configuration of the terminal

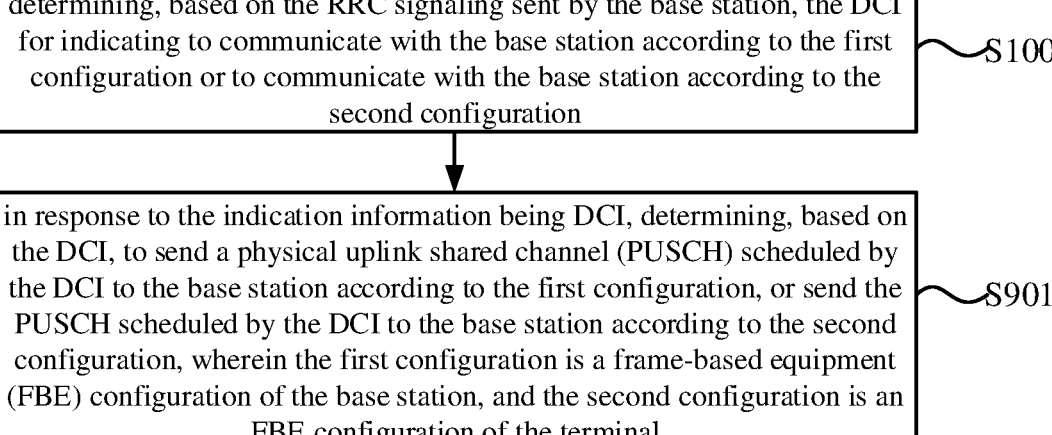

determining, based on the RRC signaling sent by the base station, the DCI for indicating to communicate with the base station according to the first configuration or to communicate with the base station according to the second configuration ~S1001 in response to the indication information being DCI, determining, based on the DCI, to send a physical uplink shared channel (PUSCH) scheduled by the DCI to the base station according to the first configuration, or send the PUSCH scheduled by the DCI to the base station according to the second configuration, wherein the first configuration is a frame-based equipment (FBE) configuration of the base station, and the second configuration is an FBE configuration of the terminal ~S901

FIG. 10 sending indication information to a terminal, wherein the indication information is configured to indicate the terminal to communicate with the base station according to a first configuration or to communicate with the base station according to a second configuration, wherein the first configuration is a frame-based configuration (FBE) for the base station, and the second configuration is an FBE configuration of the terminal ~S1101

FIG. 11 sending the RRC signaling to the terminal, wherein the RRC signaling configures the DCI to indicate communication with the base station according to the first configuration or communication with the base station according to the second configuration  ～ S1201 sending indication information to a terminal, wherein the indication information is configured to indicate the terminal to communicate with the base station according to a first configuration or to communicate with the base station according to a second configuration, wherein the first configuration is a frame-based configuration (FBE) for the base station, and the second configuration is an FBE configuration of the terminal  ～ S1101

FIG. 12 in response to time domain resources corresponding to the first configuration overlapping with time domain resources corresponding to the second configuration, sending the indication information to the terminal, wherein the first configuration is a frame-based configuration (FBE) for the base station, and the second configuration is an FBE configuration of the terminal  ～ S1301

FIG. 13 apparatus for indicating a configuration indication sending module                    2001 apparatus for indicating a configuration indication sending module                    2001 signaling sending module                     2101

CONFIGURATION DETERMINATION METHOD AND DEVICE, AND CONFIGURATION INDICATION METHOD AND DEVICE

CROSS-REFERENCE TO RELATED APPLICATION

This application is the U.S. national phase application of International Application No. PCT/CN2020/133980, filed on Dec. 4, 2020, the entire disclosure of which is incorporated herein by reference.

TECHNICAL FIELD

The present disclosure relates to a field of communication technologies, and particularly to a method for determining a configuration, a method for indicating a configuration, an apparatus for determining a configuration, an apparatus for indicating a configuration, an electronic device and a computer-readable storage medium.

BACKGROUND

A terminal may communicate with a base station in an unlicensed spectrum. Before occupying the unlicensed spectrum, a transmitting end of either the terminal or the base station may perform a clear channel assessment (CCA) on a channel in the unlicensed spectrum. When the channel is determined to be idle after performing the CCA, the channel may be occupied to send information to a receiving end. The maximum duration for channel occupancy is defined as maximum channel occupy time (MCOT). If the channel is determined to be busy, the channel cannot be occupied for communication.

The above process is called a channel access mechanism of Listen Before Talk (LBT). The LBT generally includes two ways, i.e., Frame-Based Equipment (FBE) and Load-Based Equipment (LBE).

FBE is a channel detection and access mechanism with a fixed frame period (FFP). In the related art, an FBE configuration may be set for the base station, an FBE configuration may also be set for the terminal, and the FBE configuration of the base station may be different from the FBE configuration of the terminal.

SUMMARY

According to a first aspect of the disclosure, a method for determining a configuration is performed by a terminal. The method includes:

determining, based on indication information, whether to communicate with a base station according to a first configuration or to communicate with the base station according to a second configuration, in which the first configuration is a channel occupancy configuration by the base station, and the second configuration is a channel occupancy configuration by the terminal.

According to the second aspect of the disclosure, a method for indicating a configuration is performed by a base station. The method includes:

sending indication information to the terminal, in which the indication information is configured to indicate the terminal to communicate with the base station according to a first configuration or to communicate with the base station according to a second configuration. The first configuration is a channel occupancy configuration by the base station, and the second configuration is a channel occupancy configuration by the terminal.

According to a third aspect of the disclosure, an electronic device is provided, including: a processor and a memory for storing instructions executable by the processor. The processor is configured to execute the above method for determining a configuration according to the first aspect.

BRIEF DESCRIPTION OF THE DRAWINGS

The accompanying drawings used in the description of the embodiments are briefly introduced below. The accompanying drawings in the following description are only some embodiments of the disclosure. For those skilled in the art, other embodiments may also be obtained.

FIG. 1 is a schematic flowchart illustrating a method for determining a configuration according to an embodiment of the disclosure.

FIG. 2 is a schematic diagram illustrating an FBE configuration according to an embodiment of the disclosure.

FIG. 3 is a schematic flowchart illustrating another method for determining a configuration according to an embodiment of the disclosure.

FIG. 5 is a schematic flowchart illustrating yet another method for determining a configuration according to an embodiment of the disclosure.

FIG. 8 is a schematic flowchart illustrating yet another method for determining a configuration according to an embodiment of the disclosure.

FIG. 9 is a schematic flowchart illustrating yet another method for determining a configuration according to an embodiment of the disclosure.

FIG. 10 is a schematic flowchart illustrating yet another method for determining a configuration according to an embodiment of the disclosure.

FIG. 11 is a schematic flowchart illustrating a method for indicating a configuration according to an embodiment of the disclosure.

FIG. 12 is a schematic flowchart illustrating another method for indicating a configuration according to an embodiment of the disclosure.

FIG. 13 is a schematic flowchart illustrating yet another method for indicating a configuration according to an embodiment of the disclosure.

DETAILED DESCRIPTION

Figure 4:
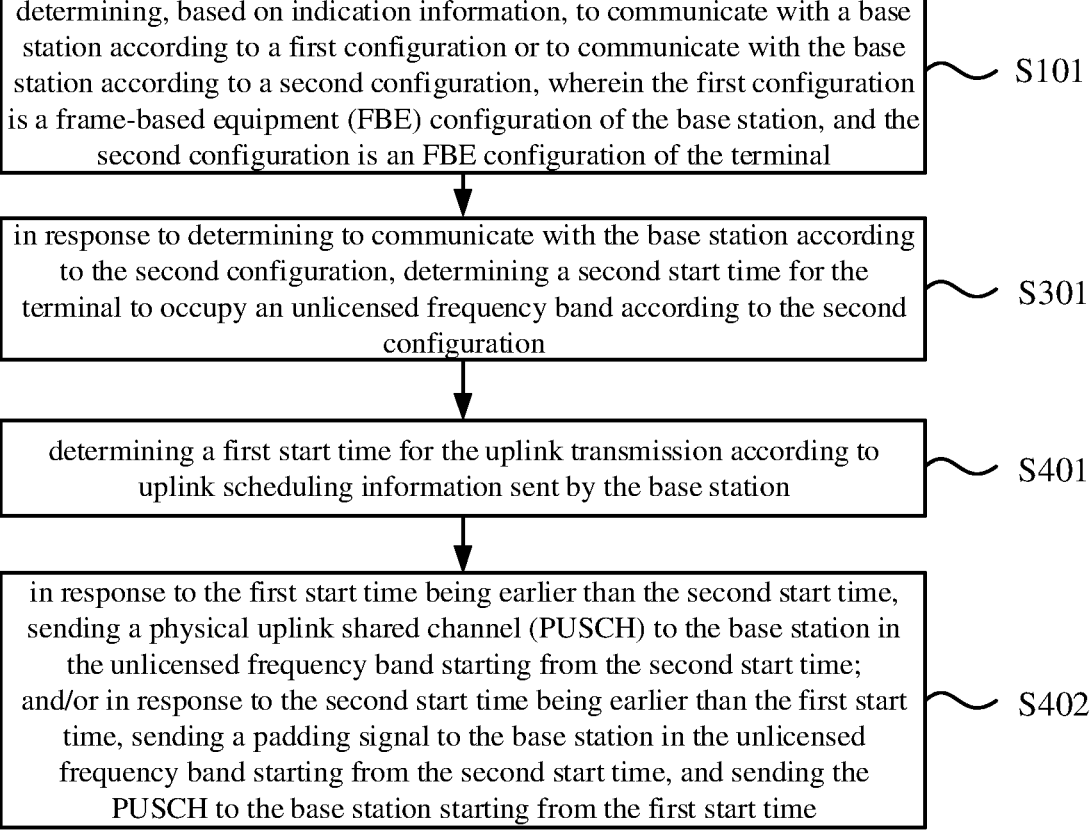
FIG. 4 is a schematic flowchart illustrating yet another method for determining a configuration according to an embodiment of the disclosure.

The technical solutions in the embodiments of the disclosure may be clearly and completely described below with reference to the accompanying drawings in the embodiments of the disclosure. The described embodiments are only some of rather than not all of the embodiments of the disclosure. Based on the embodiments in the disclosure, all other embodiments obtained by those skilled in the art without creative efforts belong to the protection scope of the disclosure.

FIG. 1 is a schematic flowchart illustrating a method for determining a configuration according to an embodiment of the disclosure. The method for determining a configuration shown in this embodiment can be applied to a terminal. The terminal includes but is not limited to an electronic device such as a mobile phone, a tablet computer, a wearable device, a sensor, and an Internet of Things device. The terminal may serve as a user equipment (UE) to communicate with the base station. The base station includes but is not limited to a 4G base station, a 5G base station, and a 6G base station. In an embodiment, the terminal may be a terminal to which the method for indicating a configuration described in any subsequent embodiment is applicable.

In an embodiment, in order to simplify occupancy of a channel in the unlicensed spectrum, taking the base station as a transmitting end as an example, after the base station occupies a channel and before a duration of occupying the channel by the base station reaches the maximum channel occupy time (MCOT), the base station may share the channel with the terminal. The process is COT sharing. As such, the terminal occupies the channel to send information to the base station. In this case, the terminal needs to occupy the channel according to the FBE configuration of the base station.

However, when the terminal is also set with an FBE configuration, and the FBE configuration of the base station overlaps with the FBE configuration of the terminal in time domain resources, it may cause the terminal to be unable to determine whether communication is performed in the overlapping time domain resources according to the FBE configuration of the base station or according to the FBE configuration of the terminal itself.

The following embodiments mainly describe the case where the base station shares a channel with the terminal, and the content is mainly for the description of a single sharing process, i.e., the description in one fixed frame period (FFP). The base station may occupy the channel for multiple times, and may also share the occupied channel to the terminal for multiple times.

As shown in FIG. 1, the method for determining a configuration may include the following step at S101.

At S101, it is determined based on the indication information, to communicate with the base station according to a first configuration, or to communicate with the base station according to a second configuration. The first configuration is a frame-based equipment (FBE) configuration of the base station, and the second configuration is an FBE configuration of the terminal.

In an embodiment, the FBE configuration includes but not limited to a length of MCOT, a start time of MCOT, an end time of MCOT and so on.

In an embodiment, the indication information may be sent to the terminal by the base station, may also be sent to the terminal by other terminal or a core network, may also be pre-stored in the terminal, or may be determined by the terminal according to a protocol.

In an embodiment, after the base station occupies a channel in the unlicensed spectrum, the channel may be shared with the terminal before the occupancy of the channel reaches the MCOT in the first configuration.

Taking the base station sending the indication information to the terminal as an example, the indication information may be sent to the terminal by the base station after occupying the channel, or may be sent to the terminal in advance before occupying the channel. For example, the indication information may be sent to the terminal before occupying the channel at a previous time, or may be sent to the terminal when communicating with the terminal in a licensed frequency band. In addition, the base station may also send the first configuration to the terminal.

In an embodiment, the indication information may be a radio resource control (RRC) signaling, or downlink control information (DCI), which may be specifically set as needed.

Since the base station shares the channel with the terminal, the terminal may communicate with the base station according to the FBE configuration of the base station, and when the terminal itself is also configured with an FBE configuration, the terminal may also communicate with the base station according to its own FBE configuration.

According to the embodiment of the disclosure, the terminal may determine based on the indication information, to communicate with the base station according to the first configuration or to communicate with the base station according to the second configuration, so that the terminal may determine one configuration to communicate with the base station, when the terminal may communicate with the base station according to the FBE configuration of the base station and may also communicate with the base station according to the FBE configuration of the terminal. In this way, it is avoided that the terminal is unable to determine which configuration to communicate with the base station, which affects the communication process.

FIG. 2 is a schematic diagram illustrating an FBE configuration according to an embodiment of the disclosure.

In order to occupy a channel in an unlicensed spectrum, the base station may first perform clear channel assessment (CCA) on the channel. When the channel is determined to be idle after performing the CCA, it may start to occupy the channel. A duration of occupying the channel is COT, which may be MCOT for example, and COT shown in FIG. 2 is less than or equal to MCOT. After the occupancy ends, an idle period may be awaited to perform CCA on the channel again. For FBE, the fixed frame period (FFP) may be a time interval from one CCA to the next CCA.

The FBE configuration of the base station may be different from the FBE configuration of the terminal, and a channel occupancy mechanism of the transmitting end needs the transmitting end to start occupying the channel from the start time of the COT, rather than a certain time point between the start time of the COT and the end time of the COT.

Then, after the base station as a transmitting end occupies the channel, the base station may share the channel with the terminal before the end of the COT. The specific sharing method can be set according to the needs. For example, the base station may send scheduling information to the terminal, so as to schedule the terminal to send a physical uplink shared channel (PUSCH) to the base station within the COT of the channel In this case, the terminal may determine that the base station shares the channel.

For example, the scheduling information schedules the terminal to send the PUSCH to the base station from 2 ms to 3 ms. In the FBE configuration of the base station, the start time of COT is 0.5 ms, and the end time of COT is 3.5 ms. In the FBE configuration of the terminal, the start time of COT is 1.5 ms, the end time of COT is 4 ms.

It can be seen that the FBE configuration of the base station and the FBE configuration of the terminal may overlap in time domain resources. On the overlapping time domain resources, the terminal may send the PUSCH according to the FBE configuration of the terminal and send the PUSCH according to the FBE configuration of the base station.

When the terminal sends the PUSCH according to the FBE configuration of the base station, a start time (for example, called as the first start time) of sending the PUSCH may be determined according to the scheduling information, then the channel may be occupied to send the PUSCH starting from the first start time. That is, the terminal starts to occupy the channel from 2 ms to send the PUSCH.

When the terminal sends the PUSCH according to the FBE configuration of the terminal itself, a start time (for example, called as the second start time) of COT may be determined in the FBE configuration of the terminal, then the channel may be occupied from the second start time and the PUSCH is sent at the first start time. That is, the terminal starts to occupy the channel from 1.5 ms and starts to send the PUSCH at 2 ms.

It can be seen that the actions performed by the terminal sending the PUSCH according to the FBE configuration of the base station may be different from those performed by the terminal sending the PUSCH according to its own FBE configuration. According to the embodiments of the disclosure, the terminal may determine based on the indication information, to communicate with the base station according to the FBE configuration of the base station or to communicate with the base station according to the FBE configuration of the terminal, so that the terminal determine one configuration to communicate with the base station, when the terminal may communicate with the base station according to the FBE configuration of the base station and may also communicate with the base station according to the FBE configuration of the terminal. In this way, it is avoided that the terminal is unable to determine which configuration to communicate with the base station, which affects the communication process.

FIG. 3 is a schematic flowchart illustrating another method for determining a configuration according to an embodiment of the disclosure. As shown in FIG. 3, in some embodiments of the disclosure, the method for determining a configuration may further include the following steps at S301-S302.

At S301, in response to determining to communicate with the base station according to the second configuration, a second start time for the terminal to occupy an unlicensed spectrum is determined according to the second configuration.

At S302, uplink transmission to the base station is performed in the unlicensed spectrum starting from the second start time.

In an embodiment, when the terminal determines based on the indication information to communicate with the base station according to the FBE configuration of the terminal, the terminal is used as an initiator, needs to occupy the channel in the unlicensed spectrum from the start time of the COT, and thus determines the COT start time in the FBE configuration of the terminal as the second start time of occupying the unlicensed spectrum, so that the channel in the unlicensed spectrum is occupied from the second start time, for uplink transmission to the base station, for example, PUSCH is sent to the base station.

FIG. 4 is a schematic flowchart illustrating yet another method for determining a configuration according to an embodiment of the disclosure. As shown in FIG. 4, in some embodiments of the disclosure, performing uplink transmission to the base station in the unlicensed spectrum starting from the second start time includes the following steps at S401-S402.

At S401, a first start time for uplink transmission is determined according to uplink scheduling information sent by the base station;

At S402, in response to the first start time being earlier than the second start time, a physical uplink shared channel (PUSCH) is sent to the base station in the unlicensed spectrum starting from the second start time; and/or in response to the second start time being earlier than the first start time, a padding signal is sent to the base station in the unlicensed spectrum starting from the second start time, and the PUSCH is sent to the base station starting from the first start time.

In an embodiment, the base station may send the uplink scheduling information to the terminal, so that the terminal is scheduled to perform uplink transmission. The terminal may determine the first start time for uplink transmission according to the uplink scheduling information. For example, the uplink scheduling information indicates time domain resources when the terminal performs uplink transmission, and a starting position of the time domain resources may be used as the first starting time.

In the case where the first start time is earlier than the second start time, for example, the uplink scheduling information schedules the terminal to start sending the PUSCH to the base station from 1 ms, the start time of COT in the FBE configuration of the terminal is 1.5 ms, and 1 ms is earlier than 1.5 ms, the terminal (as a transmitting end), in a case of communicating with the base station according to the FBE configuration of the terminal, may occupy the channel in the unlicensed spectrum from the start time of COT in the FBE configuration at the earliest, i.e., start occupying the channel at 1.5 ms to send the PUSCH to the base station.

It should be noted that, when the first start time is earlier than the second start time, the terminal may determine a first end time for uplink transmission according to the uplink scheduling information, and compare the first end time with the second start time. When the first end time is also earlier than the second start time, it may cause that the terminal fails to perform uplink transmission smoothly when communicating with the base station according to the second configuration. In this case, after occupying the channel, the terminal may send feedback information to the base station, informing the base station that the terminal fails to perform uplink transmission smoothly.

In the case where the second start time is earlier than the first start time, for example, the uplink scheduling information schedules the terminal to start sending the PUSCH to the base station from 2 ms, the start time of COT in the FBE configuration of the terminal is 1.5 ms, and 1.5 ms is earlier than 2 ms, the terminal (as a transmitting end), in a case of communicating with the base station according to the FBE configuration of the terminal, may occupy the channel in the unlicensed spectrum from the start time of COT in the FBE configuration at the earliest, so i.e., start occupying the channel at 1.5 ms, but the base station schedules the terminal to start sending the PUSCH from 2 ms, then the terminal needs to send the PUSCH to the base station in the channel at 2 ms.

During the period from 1.5 ms to 2 ms, in order to occupy the channel, the terminal may send a padding signal in the channel. The specific content of the padding signal may be set according to needs, for example, it may be set by the terminal according to needs, or may be instructed by the base station, may also be determined through a negotiation between the terminal and the base station. For example, the PUSCH may be sent repeatedly.

FIG. 5 is a schematic flowchart illustrating yet another method for determining a configuration according to an embodiment of the disclosure. As shown in FIG. 5, in some embodiments of the disclosure, in response to determining to communicate with the base station according to the second configuration, the method further includes the following steps at S501-S502.

At S501, a first end time for uplink transmission is determined according to uplink scheduling information sent by the base station; and a second end time for the terminal to occupy an unlicensed spectrum is determined according to the second configuration.

It should be noted that the execution order of determining the first end time and determining the second end time may be set according to needs. For example, the first end time is determined first, or the second end time is determined first, or the first time and the second time are determined together.

At S502, in response to the first end time being earlier than the second end time, sending the PUSCH to the base station in the unlicensed spectrum is stopped at the first end time;

and/or in response to the second end time being earlier than the first end time, sending the PUSCH to the base station in the unlicensed spectrum is stopped at the second end time.

In an embodiment, the base station may send the uplink scheduling information to the terminal, so that the terminal is scheduled to perform uplink transmission, and the terminal may determine the first end time for uplink transmission according to the uplink scheduling information. For example, the uplink scheduling information indicates time domain resources when the terminal performs uplink transmission, and an end position of the time domain resources may be used as the first end time.

The base station may also determine the second end time for the terminal to occupy the unlicensed spectrum according to the second configuration. For example, the end time of COT in the FBE configuration of the terminal is used as the second end time.

In the case where the first end time is earlier than the second end time, for example, the uplink scheduling information schedules the terminal to stop sending the PUSCH to the base station at 2 ms, the end time of COT in the FBE configuration of the terminal is 2.5 ms, and 2 ms is earlier than 2.5 ms, the terminal, in a case of communicating with the base station according to the FBE configuration of the terminal, may finish occupying the channel in the unlicensed spectrum at the end time of COT in the FBE configuration at the latest. However, the first end time is earlier than the second end time, so the terminal does not need to stop sending the PUSCH at the second end time, but stop sending the PUSCH to the base station at the first end time. As for whether the channel continues to be occupied from the first end time to the second end time, the terminal may decide according to the actual situation.

In the case where the second end time is earlier than the first end time, for example, the uplink scheduling information schedules the terminal to stop sending the PUSCH to the base station from 3 ms, the end time of COT in the FBE configuration of the terminal is 2.5 ms, and 2.5 ms is earlier than 3 ms, the terminal, in a case of communicating with the base station according to the FBE configuration of the base station, may finish occupying the channel in the unlicensed spectrum at the COT end time in the FBE configuration at the latest. Although sending the PUSCH may not be completed within 2.5 ms, occupancy of the channel has already ended and thus it is necessary to stop sending the PUSCH in the channel.

Figure 6:
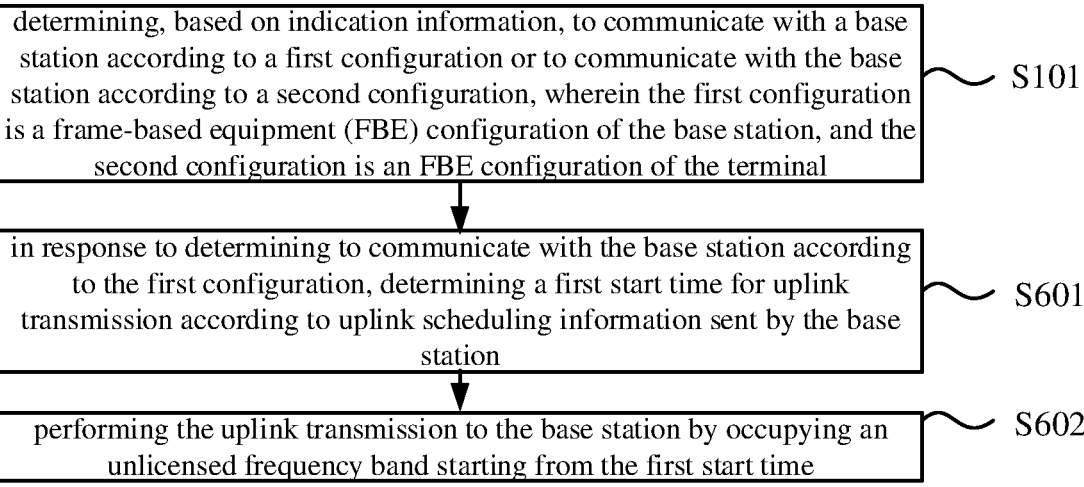
FIG. 6 is a schematic flowchart illustrating yet another method for determining a configuration according to an embodiment of the disclosure.

FIG. 6 is a schematic flowchart illustrating yet another method for determining a configuration according to an embodiment of the disclosure. As shown in FIG. 6, in some embodiments of the disclosure, the method may further include the following steps at S601-S602.

At S601, in response to determining to communicate with the base station according to the first configuration, a first start time for uplink transmission is determined according to uplink scheduling information sent by the base station.

At S602, an unlicensed spectrum is occupied to perform uplink transmission to the base station starting from the first start time.

In an embodiment, when the terminal determines, based on the indication information, to communicate with the base station according to the FBE configuration of the base station, the base station acts as an initiator and shares a channel occupied in the unlicensed spectrum to the base station, and the base station may determine the first start time for uplink transmission according to uplink scheduling information, occupy the channel in the unlicensed spectrum from the first start time and perform uplink transmission to the base station, for example, sending a PUSCH to the base station.

It should be noted that, in general, the start time of COT in the FBE configuration of the base station is earlier than the first start time of scheduling the terminal to perform uplink transmission, so as to ensure that when the terminal sends the PUSCH in the shared channel, the base station has already occupied said channel.

Figure 7:
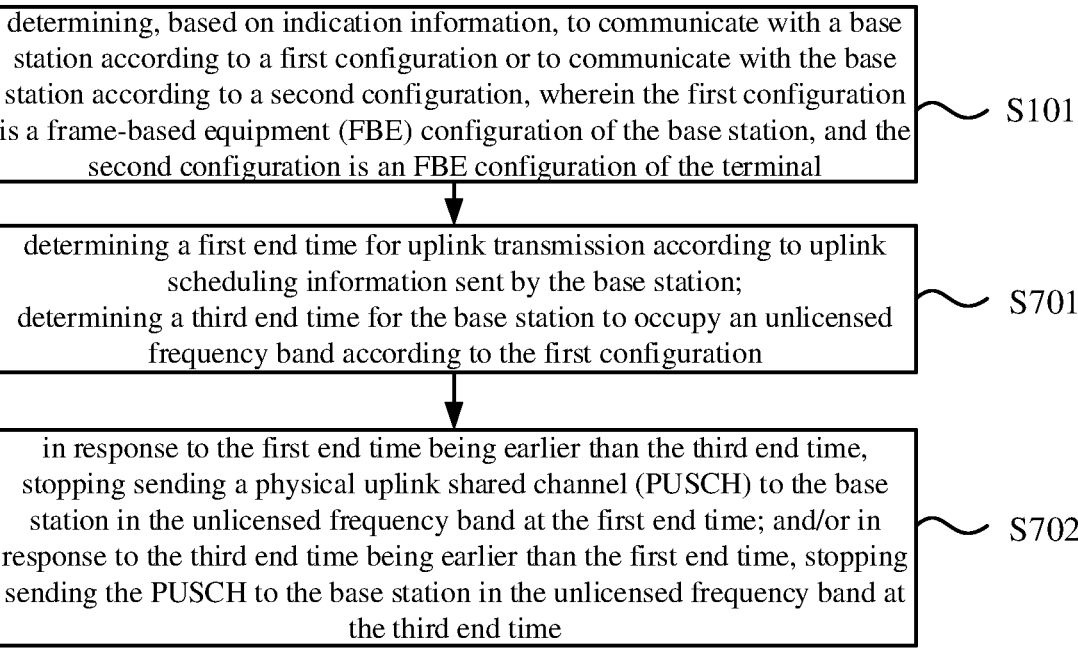
FIG. 7 is a schematic flowchart illustrating yet another method for determining a configuration according to an embodiment of the disclosure.

FIG. 7 is a schematic flowchart illustrating yet another method for determining a configuration according to an embodiment of the disclosure. As shown in FIG. 7, in some embodiments of the disclosure, in response to determining to communicate with the base station according to the first configuration, the method may further include the following steps at S701-S702.

At S701, a first end time for uplink transmission is determined according to uplink scheduling information sent by the base station; and a third end time for the base station to occupy an unlicensed spectrum is determined according to the first configuration.

It should be noted that the execution order of determining the first end time and determining the third end time may be set according to needs. For example, the first end time is determined first, or the third end time is determined first, or the first time and the third time are determined together.

At S702, in response to the first end time being earlier than the third end time, sending the PUSCH to the base station in the unlicensed spectrum is stopped at the first end time;

and/or in response to the third end time being earlier than the first end time, sending the PUSCH to the base station in the unlicensed spectrum is stopped at the third end time.

In an embodiment, the base station may send the uplink scheduling information to the terminal, so that the terminal is scheduled to perform uplink transmission. The terminal may determine the first end time for uplink transmission according to the uplink scheduling information. For example, the uplink scheduling information indicates time domain resources when the terminal performs uplink transmission, and an end position of the time domain resources may be used as the first end time.

The base station may also determine the third end time for the base station to occupy the unlicensed spectrum according to the first configuration. For example, the end time of COT in the FBE configuration of the base station is used as the third end time.

In the case where the first end time is earlier than the third end time, for example, the uplink scheduling information schedules the terminal to stop sending the PUSCH to the base station at 2 ms, the end time of COT in the FBE configuration of the base station is 2.5 ms, and 2 ms is earlier than 2.5 ms, the terminal, in a case of communicating with the base station according to the FBE configuration of the base station, may finish occupying the channel in the unlicensed spectrum at the end time of COT in the FBE configuration at the latest. However, the first end time is earlier than the third end time, so the terminal does not need to stop sending the PUSCH to the base station at the third end time, but stop sending the PUSCH to the base station at the first end time. As for whether the channel continues to be occupied from the first end time to the third end time, the terminal may decide according to the actual situation.

In the case where the third end time is earlier than the first end time, for example, the uplink scheduling information schedules the terminal to stop sending the PUSCH to the base station from 3 ms, the end time of COT in the FBE configuration of the base station is 2.5 ms, and 2.5 ms is earlier than 3 ms, the terminal, in the case of communicating with the base station according to the FBE configuration of the terminal, may finish occupying the channel in the unlicensed spectrum at the end time of COT in the FBE configuration at the latest. Although sending the PUSCH may not be completed within 2.5 ms, the base station has already ended occupancy of the channel and thus the terminal also needs to end the occupancy of the channel since the occupancy of the channel by the terminal is shared by the base station. As such, it is necessary to stop sending the PUSCH in the channel.

In an embodiment, the indication information includes at least one of:

a radio resource control (RRC) signaling, and downlink control information (DCI).

FIG. 8 is a schematic flowchart illustrating yet another method for determining a configuration according to an embodiment of the disclosure. As shown in FIG. 8, in some embodiments of the disclosure, determining based on the indication information to communicate with the base station according to the first configuration or to communicate with the base station according to the second configuration includes the following step at S801.

At S801, in response to the indication information being RRC signaling, it is determined based on the RRC signaling, to communicate with the base station according to the first configuration or to communicate with the base station according to the second configuration.

In an embodiment, when the base station uses the RRC signaling as the indication information, the terminal may be instructed to communicate with the base station according to the first configuration or the second configuration indicated by the RRC signaling before receiving the next indication information at next time.

FIG. 9 is a schematic flowchart illustrating yet another method for determining a configuration according to an embodiment of the disclosure. As shown in FIG. 9, in some embodiments of the disclosure, determining based on the indication information to communicate with the base station according to the first configuration or to communicate with the base station according to the second configuration includes the following step at S901.

At S901, in response to the indication information being DCI, it is determined based on the DCI, to send a PUSCH scheduled by the DCI to the base station according to the first configuration, or to send the PUSCH scheduled by the DCI to the base station according to the second configuration.

In an embodiment, when the base station uses the DCI as the indication information, since different DCIs may schedule different PUSCHs, the DCI may be used to instruct the terminal to send the PUSCH scheduled by the DCI according to the first configuration or according to the second configuration, which is beneficial to improve the flexibility of indication.

FIG. 10 is a schematic flowchart illustrating yet another method for determining a configuration according to an embodiment of the disclosure. As shown in FIG. 10, in some embodiments of the disclosure, the method may further include the following step at S1001.

At S1001, the DCI is determined based on the RRC signaling sent by the base station. The DCI indicates to communicate with the base station according to the first configuration or to communicate with the base station according to the second configuration.

In an embodiment, the DCI may be used to indicate that the terminal communicates with the base station according to the first configuration or the second configuration, or may not be used to indicate that the terminal communicates with the base station according to the first configuration or the second configuration. As for whether the DCI is used to instruct the terminal to communicate with the base station according to the first configuration or the second configuration, the base station can configure it through the RRC signaling, so that the terminal may know whether the subsequently received DCI may be used to instruct the terminal communicates with the base station according to the first configuration or the second configuration. As such, the terminal may analyze the DCI in an appropriate manner to accurately determine the specific content indicated by the DCI.

FIG. 11 is a schematic flowchart illustrating a method for indicating a configuration according to an embodiment of the disclosure. The method for indicating a configuration shown in this embodiment may be applicable to a base station. The base station includes but is not limited to a 4G base station, a 5G base station, and a 6G base station. The base station may communicate with a terminal serving as a UE. The terminal includes but is not limited to an electronic device such as a mobile phone, a tablet computer, a wearable device, a sensor, and an Internet of Things device. In an embodiment, the terminal may be a terminal to which the method for determining a configuration described in any of the foregoing embodiments is applicable.

In an embodiment, in order to simplify occupancy of a channel in an unlicensed spectrum, taking the base station as a transmitting end as an example, after the base station occupies a channel and before a duration of occupying the channel by the base station reaches the maximum channel occupy time (MCOT), the base station may share the channel with the terminal, so that the terminal occupies the channel to send information to the base station. In this case, the terminal needs to occupy the channel according to the FBE configuration of the base station.

However, when the terminal is also configured with an FBE configuration, and the FBE configuration of the base station overlaps with the FBE configuration of the terminal in time domain resources, it may cause the terminal to be unable to determine whether communication is performed in the overlapping time domain resources according to the FBE configuration of the base station or according to the FBE configuration of the terminal itself.

As shown in FIG. 11, the method for indicating a configuration may include the following step at S1101.

At S1101, indication information is sent to the terminal. The indication information is configured to indicate the terminal to communicate with the base station according to a first configuration or to communicate with the base station according to a second configuration. The first configuration is an FBE configuration of the base station, and the second configuration is an FBE configuration of the terminal.

In an embodiment, after the base station occupies a channel in the unlicensed spectrum, the channel may be shared with the terminal before the occupancy of the channel reaches the MCOT in the first configuration.

In an embodiment, the indication information includes at least one of:

a radio resource control (RRC) signaling, and downlink control information (DCI).

Since the base station shares the channel with the terminal, the terminal may communicate with the base station according to the FBE configuration of the base station. When the terminal itself is also configured with an FBE configuration, the terminal may also communicate with the base station according to its own FBE configuration.

According to an embodiment of the disclosure, the terminal may determine based on the indication information to communicate with the base station according to the first configuration or to communicate with the base station according to the second configuration, so that the terminal may determine one configuration to communicate with the base station, when the terminal may communicate with the base station according to the FBE configuration of the base station and may also communicate with the base station according to the FBE configuration of the terminal. In this way, it is avoided that the terminal is unable to determine which configuration to communicate with the base station, which affects the communication process.

Figures 12, 13:
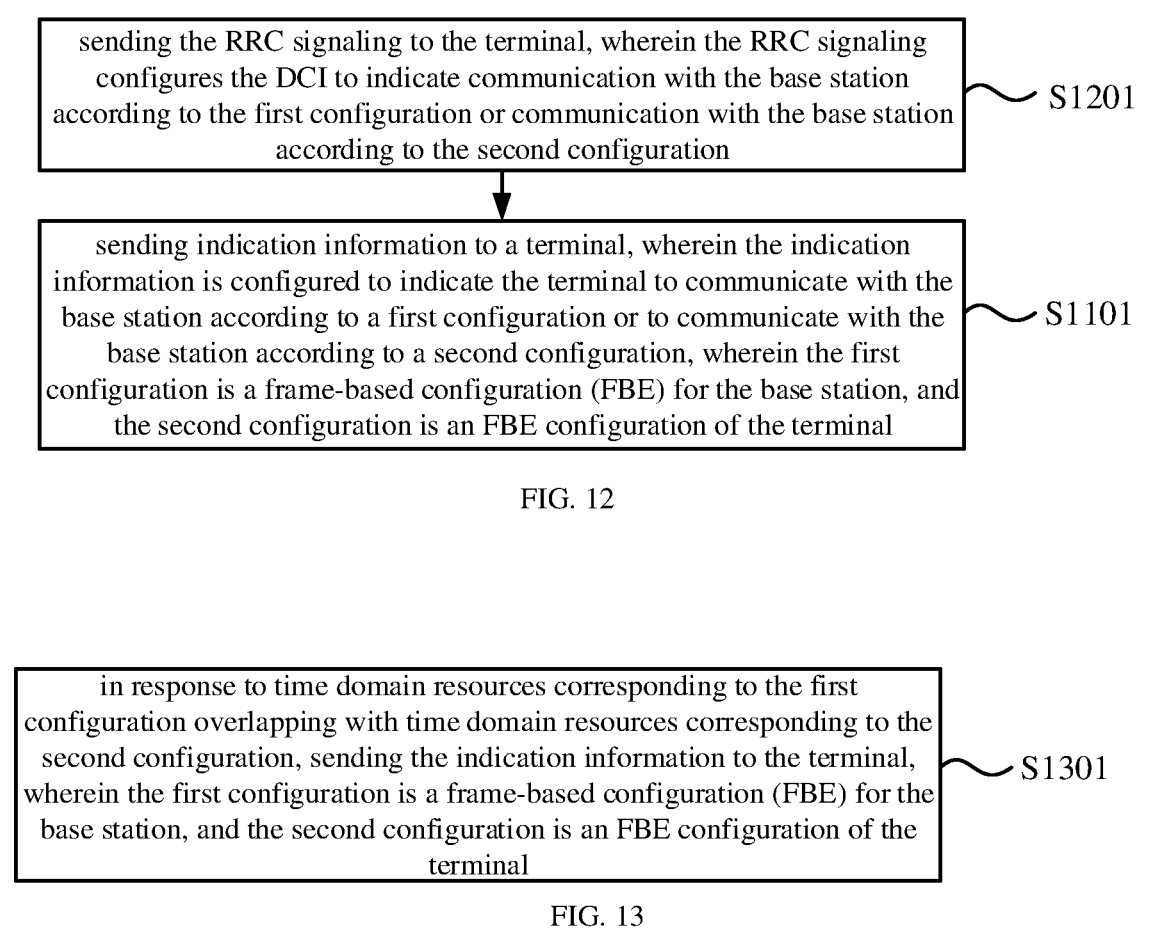

FIG. 12 is a schematic flowchart illustrating another method for indicating a configuration according to an embodiment of the disclosure. As shown in FIG. 12, in some embodiments, the indication information is the DCI, and the method may further include the following step at S1201.

At S1201, the RRC signaling is sent to the terminal. The RRC signaling configures the DCI to indicate communication with the base station according to the first configuration or communication with the base station according to the second configuration.

In an embodiment, the DCI may be used to indicate that the terminal communicates with the base station according to the first configuration or the second configuration, or may not be used to indicate that the terminal communicates with the base station according to the first configuration or the second configuration. As for whether the DCI is used to instruct the terminal to communicate with the base station according to the first configuration or the second configuration, the base station may configure it through the RRC signaling, so that the terminal may know whether the subsequently received DCI may be used to instruct the terminal to communicate with the base station according to the first configuration or the second configuration. As such, the terminal may analyze the DCI in an appropriate manner to accurately determine the specific content indicated by the DCI.

FIG. 13 is a schematic flowchart of another method for indicating a configuration according to an embodiment of the disclosure. As shown in FIG. 13, in some embodiments, the sending the indication information to the terminal includes the following step at S1301.

At S1301, in response to time domain resources corresponding to the first configuration overlapping with time domain resources corresponding to the second configuration, the indication information is sent to the terminal.

In an embodiment, the FBE configuration of the base station and the FBE configuration of the terminal may overlap in time domain resources. In the overlapped time domain resources, the terminal may send the PUSCH according to the FBE configuration of the terminal, or may send the PUSCH according to the FBE configuration of the terminal.

Therefore, in this situation, there is a technical problem that it is difficult for the terminal to determine whether to communicate with the base station according to the first configuration or the second configuration. In this embodiment, it may be first determined whether there is such a situation, i.e., whether the time domain resources corresponding to the first configuration overlap with the time domain resources corresponding to the second configuration. The indication information is sent to the terminal only when the time domain resources corresponding to the first configuration overlap with the time domain resources corresponding to the second configuration. When the time domain resources corresponding to the first configuration do not overlap with the time domain resources corresponding to the second configuration, the indication information may not be sent to the terminal, thus saving communication resources.

Corresponding to the foregoing embodiments about the method for determining a configuration and the method for indicating a configuration, the disclosure also provides embodiments of an apparatus for determining a configuration and an apparatus for indicating a configuration.

Figure 14:
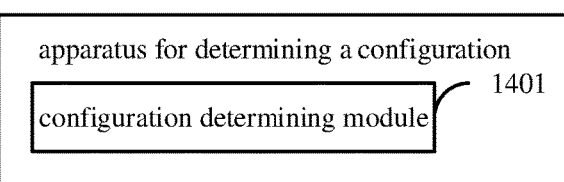
FIG. 14 is a schematic block diagram illustrating an apparatus for determining a configuration according to an embodiment of the disclosure.

FIG. 14 is a schematic block diagram illustrating an apparatus for determining a configuration according to an embodiment of the disclosure. The apparatus for determining a configuration shown in this embodiment may be applied to a terminal. The terminal includes but is not limited to an electronic device such as a mobile phone, a tablet computer, a wearable device, a sensor, and an Internet of Things device. The terminal may serve as a user equipment (UE) to communicate with a base station. The base station includes but is not limited to a 4G base station, a 5G base station, and a 6G base station. In an embodiment, the terminal may be a terminal to which the apparatus for indicating a configuration described in any subsequent embodiment is applicable.

As shown in FIG. 14, the apparatus for determining a configuration may include a configuration determining module 1401.

The configuration determining module 1401 is configured to determine, based on the indication information, to communicate with a base station according to a first configuration or to communicate with the base station according to a second configuration.

The first configuration is a frame-based equipment (FBE) configuration of the base station, and the second configuration is an FBE configuration of the terminal.

Figure 15:
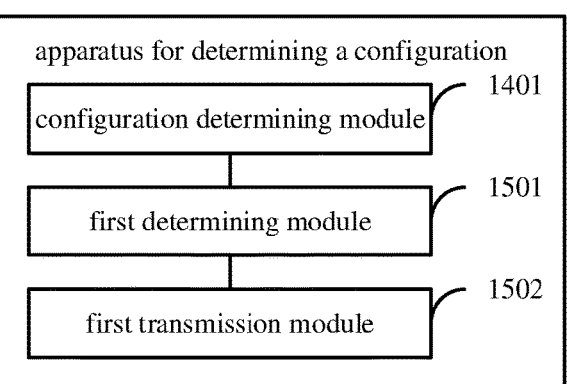
FIG. 15 is a schematic block diagram illustrating another apparatus for determining a configuration according to an embodiment of the disclosure.

FIG. 15 is a schematic block diagram illustrating another apparatus for determining a configuration according to an embodiment of the disclosure. As shown in FIG. 15, in some embodiments, the apparatus may further include a first determining module 1501 and a first transmission module 1502.

The first determining module 1501 is configured to, in response to determining to communicate with the base station according to the second configuration, determine a second start time for the terminal to occupy an unlicensed spectrum according to the second configuration.

The first transmission module 1502 is configured to perform uplink transmission to the base station in the unlicensed spectrum starting from the second start time.

In an embodiment, the first transmission module is configured to determine a first start time for uplink transmission according to uplink scheduling information sent by the base station; in response to the first start time being earlier than the second start time starting time, send a physical uplink shared channel (PUSCH) to the base station in the unlicensed spectrum; and/or in response to the second starting time being earlier than the first starting time, send a padding signal to the base station in the unlicensed spectrum starting from the second start time, and sending the PUSCH to the base station starting from the first start time.

Figure 16:
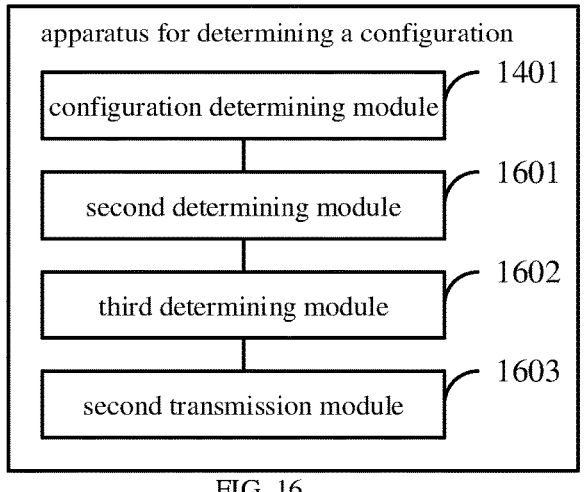
FIG. 16 is a schematic block diagram illustrating yet another apparatus for determining a configuration according to an embodiment of the disclosure.

FIG. 16 is a schematic block diagram illustrating yet another apparatus for determining a configuration according to an embodiment of the disclosure. As shown in FIG. 16, in some embodiments, the apparatus may further include a second determination module 1601, a third determination module 1602 and a second transmission module 1603.

The second determination module 1601 is configured to determine a first end time for uplink transmission according to uplink scheduling information sent by the base station.

The third determination module 1602 is configured to determine a second end time for the terminal to occupy an unlicensed spectrum according to the second configuration.

The second transmission module 1603 is configured to, in response to the first end time being earlier than the second end time, stop sending a physical uplink shared channel (PUSCH) to the base station in the unlicensed spectrum at the first end time; and/or in response to the second end time being earlier than the first end time, stop sending the PUSCH to the base station in the unlicensed spectrum at the second end time.

Figure 17:
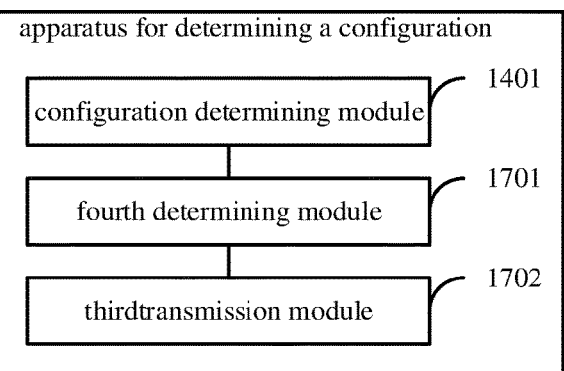
FIG. 17 is a schematic block diagram illustrating yet another apparatus for determining a configuration according to an embodiment of the disclosure.

FIG. 17 is a schematic block diagram illustrating yet another apparatus for determining a configuration according to an embodiment of the disclosure. As shown in FIG. 17, in some embodiments, the apparatus may also include a fourth determination module 1701 and a third transmission module 1702.

The fourth determination module 1701 is configured to determine a first start time for uplink transmission according to uplink scheduling information sent by the base station in response to determining to communicate with the base station according to the first configuration.

The third transmission module 1702 is configured to occupy an unlicensed spectrum to perform uplink transmission to the base station starting from the first start time.

Figures 18, 19:
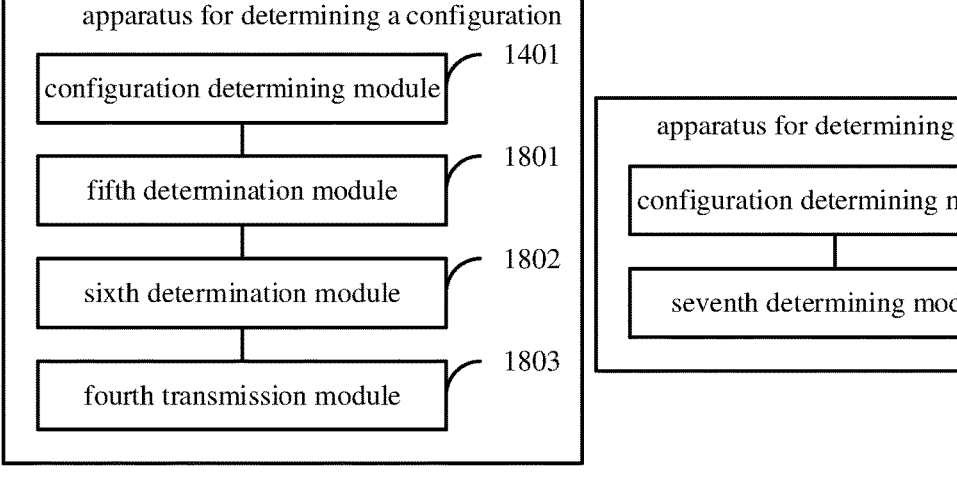
FIG. 18 is a schematic block diagram illustrating yet another apparatus for determining a configuration according to an embodiment of the disclosure.
FIG. 19 is a schematic block diagram illustrating yet another apparatus for determining a configuration according to an embodiment of the disclosure.

FIG. 18 is a schematic block diagram illustrating yet another apparatus for determining a configuration according to an embodiment of the disclosure. As shown in FIG. 18, in some embodiments, the apparatus may further include a fifth determination module 1801, a sixth determination module 1802 and a fourth transmission module 1803.

The fifth determination module 1801 is configured to determine a first end time for uplink transmission according to uplink scheduling information sent by the base station.

The sixth determination module 1802 is configured to determine a third end time for the base station to occupy an unlicensed spectrum according to the first configuration.

The fourth transmission module 1803 is configured to in response to the first end time being earlier than the third end time, stop sending a physical uplink shared channel (PUSCH) to the base station in the unlicensed spectrum at the first end time; and/or in response to the third end time being earlier than the first end time, stop sending the PUSCH to the base station in the unlicensed spectrum at the third end time.

In an embodiment, the indication information includes at least one of:

a radio resource control (RRC) signaling, and downlink control information (DCI).

In an embodiment, the configuration determining module is configured to, in response to the indication information being the RRC signaling, determine, based on the RRC signaling, to communicate with the base station according to the first configuration or to communicate with the base station according to the second configuration.

In an embodiment, the configuration determination module is configured to, in response to the indication information being DCI, determining, based on the DCI, to send a physical uplink shared channel (PUSCH) scheduled by the DCI to the base station according to the first configuration, or send the PUSCH scheduled by the DCI to the base station according to the second configuration.

FIG. 19 is a schematic block diagram illustrating yet another apparatus for determining a configuration according to an embodiment of the disclosure. As shown in FIG. 19, in some embodiments, the apparatus further includes a seventh determining module 1901:

The seventh determining module 1901 is configured to determine, based on the RRC signaling sent by the base station, that the DCI is configured to indicate to communicate with the base station according to the first configuration or to communicate with the base station according to the second configuration.

Figures 20, 21:
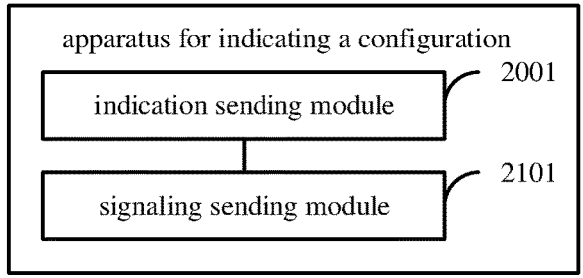
FIG. 20 is a schematic block diagram illustrating an apparatus for indicating a configuration according to an embodiment of the disclosure.
FIG. 21 is a schematic block diagram illustrating an apparatus for indicating a configuration according to an embodiment of the disclosure.

FIG. 20 is a schematic block diagram illustrating an apparatus for indicating a configuration according to an embodiment of the disclosure. The apparatus for indicating a configuration shown in this embodiment may be applied to a base station. The base station includes but is not limited to a 4G base station, a 5G base station, and a 6G base station. The base station may communicate with a terminal serving as a user equipment (UE). The terminal includes but is not limited to an electronic device such as a mobile phone, a tablet computer, a wearable device, a sensor, an Internet of Things device. In an embodiment, the terminal may be a terminal to which the apparatus for determining a configuration described in any of the foregoing embodiments is applicable.

As shown in FIG. 20, the apparatus for indicating a configuration may include an indication sending module 2001.

The indication sending module 2001 is configured to send instruction information to the terminal, where the instruction information is used to send indication information to a terminal, wherein the indication information is configured to indicate the terminal to communicate with the base station according to a first configuration or to communicate with the base station according to a second configuration, in which the first configuration is a frame-based configuration (FBE) of the base station, and the second configuration is an FBE configuration of the terminal.

In an embodiment, the indication information includes at least one of:

a radio resource control (RRC) signaling, and downlink control information (DCI).

FIG. 21 is a schematic block diagram illustrating an apparatus for indicating a configuration according to an embodiment of the disclosure. As shown in FIG. 21, in some embodiments, the indication information is the DCI, and the apparatus further includes a signaling sending module 2101.

The signaling sending module 2101 is configured to send the RRC signaling to the terminal. The RRC signaling configures the DCI to indicate communication with the base station according to the first configuration or communication with the base station according to the second configuration.

In an embodiment, the indication sending module is configured to in response to time domain resources corresponding to the first configuration overlapping with time domain resources corresponding to the second configuration, send the indication information to the terminal.

With regard to the apparatus in the above embodiments, the specific manner in which each module executes operations has been described in detail in the related method embodiments, which may not be described in detail here.

As for the apparatus embodiment, since it basically corresponds to the method embodiment, the related parts refer to the part description of the method embodiment. The apparatus embodiments described above are only exemplary. The modules described as separate components may or may not be physically separated, and the components shown as modules may or may not be physical modules. That is, the components may be located in one place, or may be distributed to multiple network modules. A part or all of the modules may be selected according to actual needs, to achieve the purpose of the embodiments. It may be understood and implemented by those skilled in the art without creative effort.

Embodiments of the disclosure also provide an electronic device, including:

a processor and a memory for storing instructions executable by the processor.

The processor is configured to execute the above method for determining a configuration and/or method for indicating a configuration Embodiments of the disclosure also provide a computer-readable storage medium, on which a computer program is stored. When the program is executed by a processor, the steps in the above method for determining a configuration and/or method for indicating a configuration are implemented.

Figure 22:
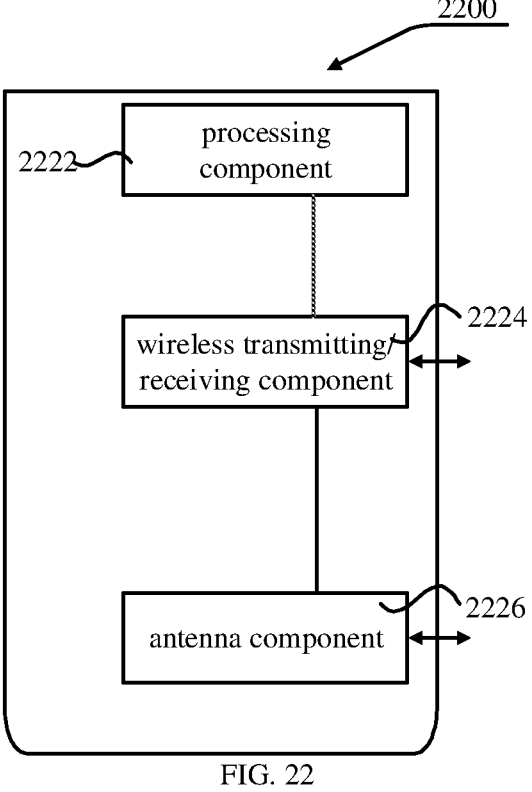
FIG. 22 is a schematic block diagram illustrating a device for indicating a configuration according to an embodiment of the disclosure.

As shown in FIG. 22, it is a schematic block diagram illustrating a device 2200 for indicating a configuration according to an embodiment of the disclosure. The device 2200 may be provided as a base station. Referring to FIG. 22, the device 2200 includes a processing component 2222, a wireless transmitting/receiving component 2224, an antenna component 2226, and a signal processing component specific to a wireless interface. The processing component 2222 may further include one or more processors. One of the processors in the processing component 2222 may be configured to implement the method for indicating a configuration described in any of the foregoing embodiments.

Figure 23:
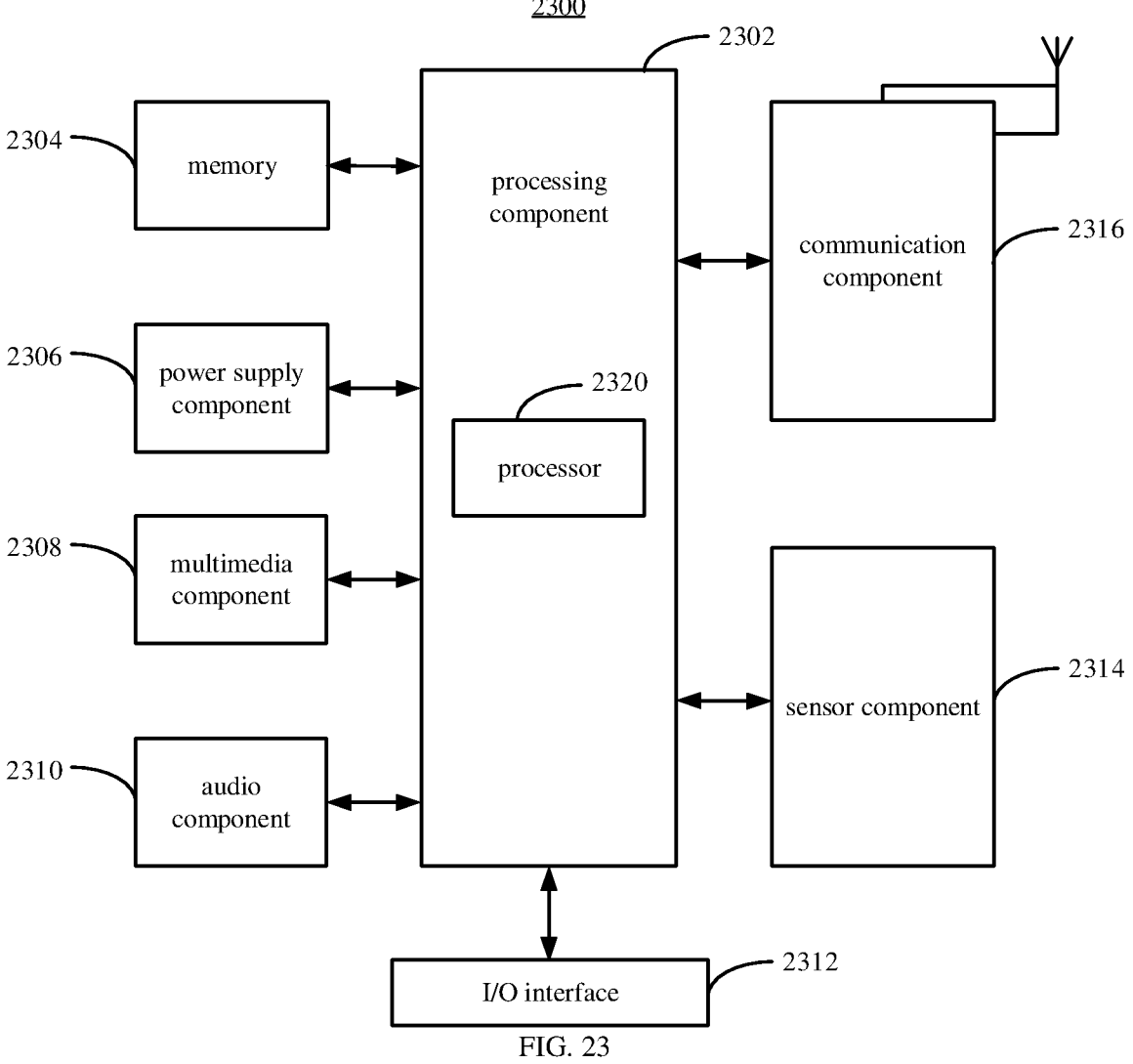
FIG. 23 is a schematic block diagram illustrating a device for determining a configuration according to an embodiment of the disclosure.

FIG. 23 is a schematic block diagram illustrating a device 2300 for determining a configuration according to an embodiment of the disclosure. For example, the device 2300 may be a mobile phone, a computer, a digital broadcast terminal, a messaging device, a game console, a tablet device, a medical device, a fitness device, a personal digital assistant, and the like.

Referring to FIG. 23, the device 2300 may include one or more of the following components: a processing component 2302, a memory 2304, a power supply component 2306, a multimedia component 2308, an audio component 2310, an input/output (I/O) interface 2312, a sensor component 2314, and a communication component 2316.

The processing component 2302 generally controls overall operations of the device 2300, such as those associated with display, telephone calls, data communications, camera operations, and recording operations. The processing component 2302 may include one or more processors 2320 to execute instructions, so as to complete all or part of the steps of the above method for determining a configuration. Additionally, the processing component 2302 may include one or more modules that facilitate interactions between the processing component 2302 and other components. For example, the processing component 2302 may include a multimedia module to facilitate interactions between the multimedia component 2308 and the processing component 2302.

The memory 2304 is configured to store various types of data to support operations at the device 2300. Examples of such data include instructions for any application or method operating on the device 2300, contact data, phonebook data, messages, pictures, videos, and the like. The memory 2304 may be implemented by any type of volatile or non-volatile storage device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 2306 provides power to the various components of the device 2300. The power components 2306 may include a power management system, one or more power supplies, and other components associated with generating, managing, and distributing power for the device 2300.

The multimedia component 2308 includes a screen providing an output interface between the device 2300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also detect a duration and a pressure associated with the touch or swipe action. In some embodiments, the multimedia component 2308 includes a front camera and/or a rear camera. When the device 2300 is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 2310 is configured to output and/or input audio signals. For example, the audio component 2310 includes a microphone (MIC), which is configured to receive external audio signals when the device 2300 is in operation modes, such as a call mode, a recording mode and a speech/voice recognition mode. The received audio signals may be further stored in the memory 2304 or sent via the communication component 2316. In some embodiments, the audio component 2310 also includes a speaker for outputting the audio signals.

The I/O interface 2312 provides an interface between the processing component 2302 and a peripheral interface module, which may be a keyboard, a click wheel, a button, and the like. These buttons may include, but are not limited to: a home button, volume buttons, a start button, and a lock button.

The sensor component/assembly 2314 includes one or more sensors for providing status assessments of various aspects of device 2300. For example, the sensor component 2314 may detect an open/closed state of the device 2300, a relative positioning of a component, which is for example a display and a keypad of the device 2300. The sensor component 2314 may also detect a change in the position of the device 2300 or a component of the device 2300, a presence or absence of user contact with the device 2300, an orientation or acceleration/deceleration of the device 2300, and a temperature change of the device 2300. The sensor component 2314 may include a proximity sensor configured to detect a presence of nearby objects in the absence of any physical contact. The sensor component 2314 may also include light sensors, such as complementary metal oxide semiconductor (CMOS) or CCD image sensors, for use in imaging applications. In some embodiments, the sensor component 2314 may also include an acceleration sensor, a gyroscope sensor, a magnetic sensor, a pressure sensor or a temperature sensor.

The communication component 2316 is configured to facilitate wired or wireless communication between the device 2300 and other devices. The device 2300 may access wireless networks based on communication standards, such as WiFi, 2G or 3G, 4G LTE, 5G NR or their combination. In an exemplary embodiment, the communication component 2316 receives broadcast signals or broadcast related information from an external broadcast management system via a broadcast channel In an exemplary embodiment, the communication component 2316 also includes a near field communication (NFC) module to facilitate short-range communication. For example, the NFC module may be implemented based on radio frequency identification (RFID) technology, infrared data association (IrDA) technology, ultra wide band (UWB) technology, bluetooth (BT) technology and other technologies.

In an exemplary embodiment, the device 2300 may be programmed by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic components for performing the method for determining a configuration described above.

In an exemplary embodiment, there is also provided a non-transitory computer-readable storage medium including instructions, such as the memory 2304 including instructions, which may be executed by the processor 2320 of the device 2300 to implement the above method for determining a configuration. For example, the non-transitory computer readable storage medium may be an ROM, a random access memory (RAM), a CD-ROM, a magnetic tape, a floppy disk, an optical data storage device, and the like.

After considering the specification and practicing the disclosure herein, those skilled in the art may easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise constructions which have been described above and shown in the drawings, and various modifications and changes may be made without departing from the scope of the disclosure. The scope of the disclosure is limited only by the appended claims.

It should be noted that in this disclosure, relational terms such as first and second are only used to distinguish one entity or operation from another entity or operation, which do not necessarily require or imply that there is a relationship between these entities or operations. There is no such actual relationship or order between them. The term "comprises", "includes" or any other variation is intended to cover a non-exclusive inclusion such that a process, method, article or apparatus comprising a set of elements includes not only those elements but also other elements not expressly listed elements, or also elements inherent in such a process, method, article, or apparatus. Without further limitations, an element defined by the phrase "comprising a . . . " does not exclude the presence of additional identical elements in the process, method, article or apparatus comprising said element.

The methods and apparatuses according to the embodiments of the disclosure have been described above in detail. In this paper, the specific examples have been used to illustrate the principles and implementation methods of the disclosure. The descriptions of the above embodiments are only used to help understand the methods of the disclosure and their core concept. At the same time, for those of ordinary skill in the art, there may be changes in the specific implementation and application scope according to the concept of the disclosure. In summary, the content of this specification should not be understood as limiting the disclosure.

What is claimed is:

1. A method for determining a configuration, performed by a terminal, the method comprising:

determining, based on indication information, to communicate with a base station according to one of a first configuration or a second configuration;

wherein the first configuration is a channel occupancy configuration by the base station, and the second configuration is a channel occupancy configuration by the terminal; and wherein the indication information comprises a radio resource control (RRC) signaling and downlink control information (DCI), and determining, based on the indication information, to communicate with the base station according to one of the first configuration or the second configuration comprises:

in response to the indication information being the DCI, determining, based on the DCI, to send a physical uplink shared channel (PUSCH) scheduled by the DCI to the base station according to one of the first configuration or the second configuration; and determining, based on the RRC signaling sent by the base station, that the DCI is configured to indicate to communicate with the base station according to one of the first configuration or the second configuration.

2. The method of claim 1, further comprising:

determining to communicate with the base station according to the second configuration, and determining a start time for the terminal to occupy an unlicensed spectrum according to the second configuration.

3. The method of claim 1, further comprising:

determining to communicate with the base station according to the second configuration;

determining a first end time for uplink transmission according to uplink scheduling information sent by the base station;

determining a second end time for the terminal to occupy an unlicensed spectrum according to the second configuration; and performing at least one of:

in response to the first end time being earlier than the second end time, stopping sending a physical uplink shared channel (PUSCH) to the base station in the unlicensed spectrum at the first end time; or in response to the second end time being earlier than the first end time, stopping sending the PUSCH to the base station in the unlicensed spectrum at the second end time.

4. The method of claim 1, further comprising:

determining to communicate with the base station according to the first configuration, and determining a start time for uplink transmission according to uplink scheduling information sent by the base station; and performing the uplink transmission to the base station by occupying an unlicensed spectrum starting from the start time.

5. The method of claim 1, wherein determining, based on the indication information, to communicate with the base station according to one of the first configuration or the second configuration further comprises:

in response to the indication information being the RRC signaling, determining, based on the RRC signaling, to communicate with the base station according to one of the first configuration or the second configuration.

6. A method for indicating a configuration, performed by a base station, the method comprising:

sending indication information to a terminal, wherein the indication information is configured to indicate the terminal to communicate with the base station according to one of a first configuration or a second configuration, wherein the first configuration is a channel occupancy configuration by the base station, and the second configuration is a channel occupancy configuration by the terminal;

wherein the indication information comprises a radio resource control (RRC) signaling and downlink control information (DCI);

wherein the indication information is the DCI, a physical uplink shared channel (PUSCH) scheduled by the DCI is sent to the base station according to one of the first configuration or the second configuration, and based on the RRC signaling sent by the base station, the DCI is configured to indicate to communicate with the base station according to one of the first configuration or the second configuration.

7. The method of claim 6, wherein the indication information is the DCI, and the method further comprises:

sending the RRC signaling to the terminal, wherein the RRC signaling configures the DCI to indicate communication with the base station according to one of the first configuration or the second configuration.

8. The method of claim 6, wherein sending the indication information to the terminal comprises:

in response to time domain resources corresponding to the first configuration overlapping with time domain resources corresponding to the second configuration, sending the indication information to the terminal.

9. A terminal, comprising:

a processor; and a memory for storing instructions executable by the processor;

wherein the processor is configured to:

determine, based on indication information, to communicate with a base station according to one of a first configuration or a second configuration;

wherein the first configuration is a channel occupancy configuration by the base station, and the second configuration is a channel occupancy configuration by the terminal; and wherein the indication information comprises a radio resource control (RRC) signaling and downlink control information (DCI), and the processor is further configured to:

in response to the indication information being the DCI, determine, based on the DCI, to send a physical uplink shared channel (PUSCH) scheduled by the DCI to the base station according to one of the first configuration or the second configuration; and determine, based on the RRC signaling sent by the base station, that the DCI is configured to indicate to communicate with the base station according to one of the first configuration or the second configuration.

10. A non-transitory computer-readable storage medium having stored thereon a computer program that, when executed by a processor of a terminal, causes the terminal to perform the method of claim 1.

11. The method of claim 1, wherein the first configuration is a frame-based configuration (FBE) of the base station, and the second configuration is an FBE configuration of the terminal.

12. The method of claim 2, further comprising:

performing uplink transmission to the base station in the unlicensed spectrum starting from the start time.

13. The method of claim 6, wherein the first configuration is a frame-based configuration (FBE) of the base station, and the second configuration is an FBE configuration of the terminal.

14. The terminal of claim 9, wherein the processor is further configured to:

determine to communicate with the base station according to the second configuration, and determine a start time for the terminal to occupy an unlicensed spectrum according to the second configuration.

15. The terminal of claim 14, wherein the processor is further configured to:

perform uplink transmission to the base station in the unlicensed spectrum starting from the start time.

16. The terminal of claim 9, wherein the processor is further configured to:

determine a first end time for uplink transmission according to uplink scheduling information sent by the base station;

determine a second end time for the terminal to occupy an unlicensed spectrum according to the second configuration; and perform at least one of:

in response to the first end time being earlier than the second end time, stopping sending a physical uplink shared channel (PUSCH) to the base station in the unlicensed spectrum at the first end time; or in response to the second end time being earlier than the first end time, stopping sending the PUSCH to the base station in the unlicensed spectrum at the second end time.

\* \* \* \* \*